United States Patent
Oda et al.

(10) Patent No.: US 8,437,633 B2
(45) Date of Patent: May 7, 2013

(54) OPTICAL NETWORK AND CONTROL METHOD THEREFOR

(75) Inventors: Shoichiro Oda, Kawasaki (JP); Takeshi Hoshida, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 355 days.

(21) Appl. No.: 13/013,805

(22) Filed: Jan. 25, 2011

(65) Prior Publication Data
US 2011/0188851 A1    Aug. 4, 2011

(30) Foreign Application Priority Data
Jan. 29, 2010  (JP) .................................. 2010-019717

(51) Int. Cl.
*H04B 10/08* (2006.01)

(52) U.S. Cl.
USPC .................... 398/34; 398/26; 398/33; 398/83

(58) Field of Classification Search .................... 398/14, 398/26, 33, 34, 42, 43, 58, 59, 66, 68, 79, 398/83
See application file for complete search history.

(56) References Cited

U.S. PATENT DOCUMENTS

| | | | |
|---|---|---|---|
| 6,229,631 B1 | 5/2001 | Sato et al. | |
| 6,654,561 B1 | 11/2003 | Terahara et al. | |
| 6,952,529 B1* | 10/2005 | Mittal | 398/26 |
| 7,113,700 B2* | 9/2006 | Shimizu et al. | 398/33 |
| 7,440,648 B2 | 10/2008 | Oikawa et al. | |
| 7,787,772 B2* | 8/2010 | Ota | 398/79 |
| 2001/0019436 A1* | 9/2001 | Nakajima et al. | 359/110 |
| 2009/0080881 A1* | 3/2009 | Yokoyama | 398/16 |

FOREIGN PATENT DOCUMENTS

| | | |
|---|---|---|
| JP | 11-008590 | 1/1999 |
| JP | 2001-203414 | 7/2001 |
| JP | 2006-243571 | 9/2006 |

\* cited by examiner

*Primary Examiner* — M. R. Sedighian
(74) *Attorney, Agent, or Firm* — Fujitsu Patent Center (57) ABSTRACT

An attenuation amount corresponding to each wavelength at OADM node is optimized according to a calculation result in a network management system (NMS), so that an optical signal level diagram according to traffic volume variations is set, the level diagram allows each of optical signal quality indexes at terminal nodes for all wavelengths to be maintained at a required threshold value or more, and allows an optical signal quality index of a specific wavelength to be improved. Then, an FEC circuit in an optical receiver corresponding to the specific wavelength is turned OFF or the error correction ability is lowered, whereby power consumption of an overall optical network is efficiently reduced.

14 Claims, 5 Drawing Sheets

OPTICAL NETWORK AND CONTROL METHOD THEREFOR

CROSS-REFERENCE TO RELATED APPLICATION

This application is based upon and claims the benefit of priority of the prior Japanese Patent Application No. 2010-019717, filed on Jan. 29, 2010, the entire contents of which are incorporated herein by reference.

FIELD

The embodiments discussed herein are related to optical networks for transmitting multiple optical signals of different wavelengths using wavelength division multiplexing (WDM) technology, and relates to a control method therefor.

BACKGROUND

In recent years, in an optical network field applying WDM technology, it becomes possible to establish an optical network having a complex topology, such as a ring interconnection network or a mesh network, by using an apparatus such as an optical add-drop multiplexing (OADM) device which realizes the adding/dropping of optical signals without any optoelectronic conversion at a wavelength unit and the changing-over the optical signal path.

In an optical network having such a complex topology, paths through which optical signals of different wavelength of WDM light are passed (i.e., wavelength paths) have diversified, so that more stringent demand for quality is imposed on each optical signal which reaches a terminal node (receiving end). To satisfy this demand, it is important to design a level diagram of a WDM light within an optical network according to intended network architecture. Furthermore, it was also effective to realize a desired received signal quality by enhancing an error correction performance when subjecting an optical signal received at a terminal node to an error correction process for correcting a code error.

A conventional level diagram of WDM light within an optical network is typically designed so that an optical signal power at each wavelength is to be the same for each wavelength and for each span between nodes. Furthermore, as disclosed in Japanese Laid-Open Patent Publication No. 2001-203414 and Japanese Laid-Open Patent Publication No. 11-8590, a pre-emphasis scheme is also known for controlling signal levels of WDM light at a transmitting end for each wavelength so that characteristics such as optical signal-to-noise ratios (OSNRs) at a receiving end are to be equal for each wavelength.

Setting a transmission power corresponding to each wavelength of WDM light by the aforementioned pre-emphasis scheme allows the qualities of the received optical signals of all wavelengths to be maintained at an equivalent level. Furthermore, individually applying an error correction process having a desired performance to the received signal of each wavelength ensures receipt of optical signals of various wavelengths which are passed through various wavelength paths.

However, when the received signal qualities of optical signals of each wavelength received at a terminal node are maintained at an equivalent level without depending on wavelength in the above-described optical network of prior art, it is necessary to uniformly apply an error correction process for all wavelengths. As a result, increase in power consumption of the overall optical network poses a problem.

Specifically, enhancement of error correction performance requires an error correction circuit module such as LSI (Large Scale Integration) which performs an error correction process to conduct a more complex operation. Therefore, the circuit module for the error correction process tends to increase power consumption with increase in gate size. When the error correction process is uniformly performed on all wavelengths of the WDM light, it is required to provide and drive as many circuit modules having a desired error correction ability as the wavelengths of the WDM light. Therefore, the power consumption of the overall optical network increases with increase in number of wavelengths of the WDM light and with enhancement of error correction performance.

In the optical network having a complex topology as described above, a traffic volume in the optical network may significantly vary when optical signals are added or dropped at two or more OADM nodes. In this case, in a repeating section (span) which can afford a relatively sufficient traffic volume, the received signal quality of optical signals can be improved by setting higher than usual a level of an optical signal which can pass through the span. In other words, in a span in which the number of wavelengths of the WDM light to be transmitted between OADM nodes decreases, even if the optical signal power of each wavelength to be fed to a transmission line slightly increases, the total WDM light power does not increase as much as that which causes signal deterioration due to a nonlinear optical effect on the transmission line. Thus, a signal quality at a receiving end is improved by signal level increase at the span.

When focusing on this point, a received signal quality associated with a specific wavelength could be improved more than the other wavelengths by setting a level diagram in consideration of traffic volume variations within an optical network. If a received signal quality associated with a particular wavelength is improved, the particular wavelength merely needs an error correction process with relatively lower error correction ability or needs no error correction process, so that reduction in power consumption of the overall optical network can be expected. However, in the WDM light level diagram according to the conventional pre-emphasis scheme mentioned above, an optical signal power of each wavelength is set at a transmitting end and no level adjustment for each wavelength is performed at a node disposed partway along the transmission line, so that it is difficult to realize a level diagram which takes into account the traffic volume variations in an optical network as described above.

SUMMARY

According to one aspect of the invention, an optical network includes a plurality of nodes which are interconnected via a transmission line, and a network management system for centrally managing operations of the plurality of nodes. Each of two or more nodes among the plurality of nodes includes: an optical add-drop multiplexer configured to receive an optical signal transmitted through the transmission line, and configured to add or drop an optical signal having a predetermined wavelength to or from the optical signal; an optical receiver configured to receive an optical signal that is dropped at the optical add-drop multiplexer; an attenuator configured to variably attenuate an optical signal power of each wavelength that is added from this node to the transmission line, on a wavelength-to-wavelength basis; an attenuation amount controller configured to control an attenuation amount corresponding to each wavelength at the attenuator; a monitor configured to monitor a quality of the optical signal that is received by the optical receiver, and configured to transfer receipt quality information that represents the monitoring result to the network management system; and an error correction controller configured to control a drive state of an error correction circuit for performing error correction on a received signal at the optical receiver. The network management system includes: an input unit through which optical network information is input; a threshold value setting unit configured to set two or more threshold values for an optical signal quality index which indicates a signal quality at a terminal node for an optical signal of each wavelength that is transmitted over the optical network, based on the optical network information that is input through the input unit; a computing unit configured to determine the optical signal quality index corresponding to each wavelength based on the receipt quality information transferred from the respective nodes, and configured to compute an attenuation amount corresponding to each wavelength at the attenuator in the respective nodes so that all of the optical signal quality indexes are equal to or greater than a lowest threshold value that is set at the threshold value setting unit and so that the number of wavelengths, which makes the optical signal quality index to be greater than the threshold values other than the lowest threshold value set at the threshold setting unit, is equal to or more than a target value; and a communication unit configured to transfer attenuation amount setting information, which indicates the computation result by the computing unit, to the attenuation amount controller, and configured to transfer error correction setting information, which indicates error correction setting corresponding to each wavelength that is determined based on the computation result by the computing unit, to the error correction controller.

Furthermore, another aspect of the invention provides a control method for an optical network which has a plurality of nodes interconnected via a transmission line, and a network management system for centrally managing operations of the plurality of nodes. First, in the network management system, optical network information is received, and two or more threshold values are set for an optical signal quality index indicating a signal quality at a terminal node for an optical signal of each wavelength transmitted through the optical network, based on the optical network information. Then, in two of more optical add-drop multiplexing nodes, which receive an optical signal transmitted through the transmission line and add or drop an optical signal having a predetermined wavelength to or from the received optical signal, among the plurality of nodes, a quality of a dropped optical signal is monitored, and receipt quality information indicating the monitored result is transferred to the network management system. Subsequently, in the network management system, the optical signal quality index corresponding to each wavelength is determined based on the receipt quality information transferred from the respective optical add-drop multiplexing nodes, and an attenuation amount corresponding to each wavelength at the respective optical add-drop multiplexing nodes is computed so that all of the optical signal quality indexes are equal to or greater than a lowest threshold value among the two or more threshold values and so that the number of wavelengths, which makes the optical signal quality index to be greater than the threshold values other than the lowest threshold value, is equal to or more than a target value. Then, attenuation amount setting information indicating a computed result in the network management system is transferred to the respective optical add-drop multiplexing nodes, and error correction setting information indicating error correction setting corresponding to each wavelength that is determined based on the computed result is transferred to the respective optical add-drop multiplexing nodes. Finally, in the respective add-drop multiplexing nodes, an optical signal power of each wavelength to be added from the optical add-drop multiplexing node to the transmission line is attenuated on a wavelength-to-wavelength basis according the attenuation amount setting information from the network management system, and a drive state of an error correction circuit for correcting an error in an received signal that is received at the optical add-drop multiplexing node is controlled according to the error correction setting information from the network management system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, embodiment of the invention will be described in detail with reference to the accompanying drawings.

Figure 1:
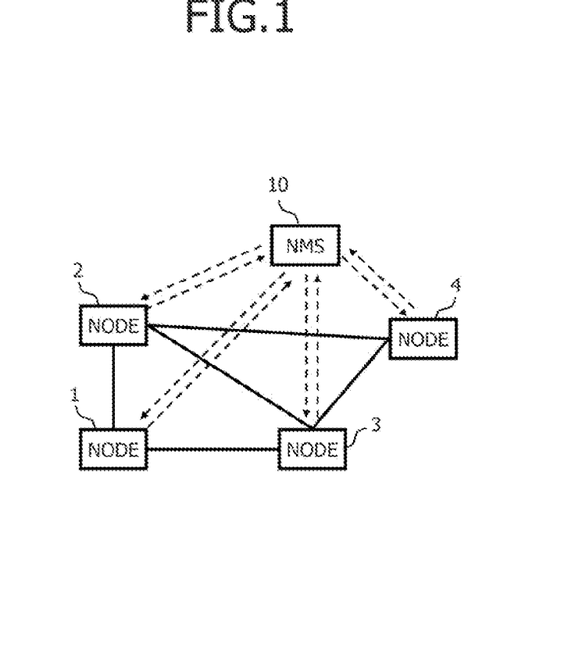
FIG. 1 is a diagram illustrating an entire configuration of an embodiment of an optical network.

FIG. 1 is a diagram illustrating an entire configuration of an optical network according to one embodiment of the invention.

Referring to FIG. 1, an optical network of the embodiment has a plurality of nodes (here, for example, four nodes 1, 2, 3, and 4) which are connected in a mesh-like manner via transmission lines. An optical add-drop multiplexing (OADM) device (not illustrated) is provided within two or more nodes among the nodes 1 to 4. Setting and operation of each node 1 to 4 are centrally managed by a network management system (NMS) 10.

Figure 2:
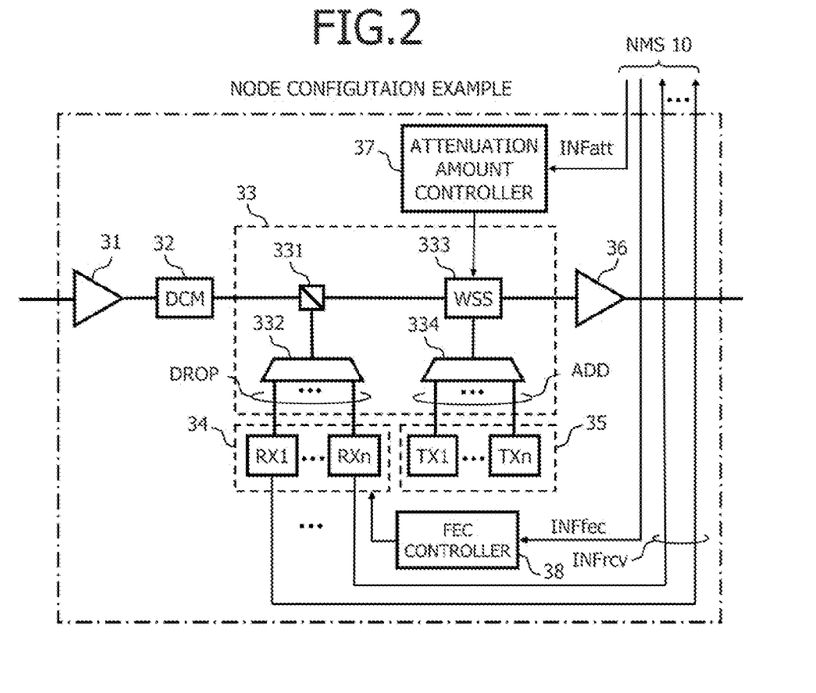
FIG. 2 is a diagram illustrating an exemplary configuration of a node having an OADM device in the embodiment.

FIG. 2 is a diagram illustrating a specific configuration example of a node having the OADM device among the aforementioned nodes 1 to 4. The node configuration illustrated in FIG. 2 includes an input-side optical amplifier 31, a dispersion compensation module (DCM) 32, an OADM device 33, an optical receiving unit 34, an optical transmitting unit 35, an output-side optical amplifier 36, an attenuation amount controller 37, and FEC controller 38.

The input-side optical amplifier 31 receives WDM light transmitted through the transmission line connecting between the nodes, and collectively amplifies optical signals of each wavelength contained in the WDM light to output the resultant optical signals to the DCM 32. The DCM 32 imparts a chromatic dispersion, which is inverse of that which occurs on the transmission line, to the WDM light amplified by the input-side optical amplifier 31 so as to compensate the dispersion of the WDM light, and outputs the WDM light thus compensated to the OADM device 33. Note that the DCM 32 may be omitted if no chromatic dispersion compensation is necessary at the particular node.

The OADM device 33 is constituted, for example, from a branching device 331, a demultiplexer 332, a wavelength selective switch (WSS) 333, and a multiplexer 334. The branching device 331 branches WDM light from the DCM 32 into two WDM lights according to a required branching ratio, and supplies one of the WDM lights to the demultiplexer 332 and supplies the other of the WDM lights to the WSS 333. The demultiplexer 332 separates the WDM light from the branching device 331 according to the wavelength, and outputs the resultant optical signals of respective wavelengths to the optical receiver 34 as drop-light. The multiplexer 334 multiplexes the optical signals of respective wavelengths outputted from the optical transmitting unit 35 as add-light, and outputs the optical signals thus multiplexed to the WSS 333.

The WSS 333 is a known optical switching module for selecting a light input-output path for each wavelength by separating a received light beam according to a wavelength using a spectroscopic element (not illustrated) and then reflecting the separated light beams by movable mirrors (not illustrated) for each wavelength (see, for example, Japanese Laid-Open Patent Publication No. 2006-243571). Here, as input light to the WSS 333, both the WDM light (through-light) from the branching device 331 and the light multiplexing optical signals (add-light) of each wavelength from the light transmitting unit 35 by the multiplexer 334 are supplied. The WSS 333 adjusts the angle of each reflection plane of a movable mirror each associated with a specific wavelength according to the setting regarding which one of the through-light and the add-light is to be selected for each wavelength, so that the selected light (through-light or add-light) for each wavelength is emitted from a single output port that is connected to the output-side optical amplifier 36. Furthermore, the WSS 333 also offsets, according to a control signal from the attenuation amount controller 37, the angle of the reflection plane of the movable mirror corresponding to the selected light of each wavelength from an optimum position for connecting to the output port above, so as to attenuate the output power of the selected light on a wavelength-to-wavelength basis. In other words, the WSS 333 has a function as an optical switch for selecting one of through-light and add-light for each wavelength, and a function as a variable optical attenuator for individually attenuating optical signal powers of respective selected wavelengths.

Figure 3:
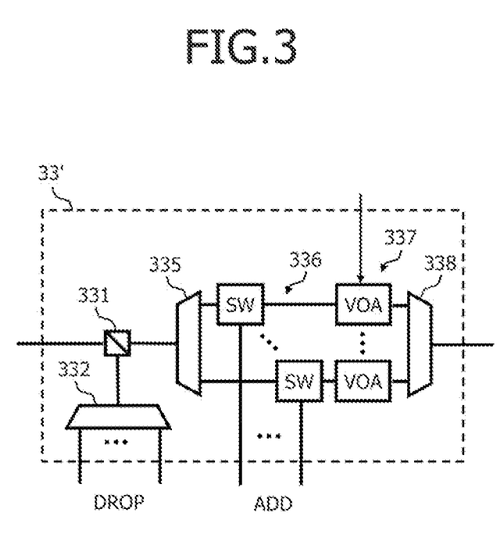
FIG. 3 is a diagram illustrating another exemplary configuration of an OADM device.

One example for configuring an OADM device 33 using a WSS 333 has been described above. However, the configuration of the OADM device is not limited thereto. For example, as in the OADM device 33' illustrated in FIG. 3, a demultiplexer 335, 2×1 optical switches (SW) 336, variable optical attenuators (VOA) 334, and a multiplexer 338 may be used in place of the WSS 333 and the multiplexer 334 described above. The OADM device 33' in FIG. 3 selects, at optical switches 336 respectively associated with individual wavelengths, optical signals of respective wavelength which are demultiplexed by the demultiplexer 335 (through-light) and optical signals of respective wavelengths which are output from the optical transmitting unit 35 in FIG. 2 (add-light). The optical signals of respective wavelengths selected by the optical switches 336 are attenuated by the VOAs 337 on a wavelength-to-wavelength basis according to a control signal from the attenuation amount controller 37 in FIG. 2. The attenuated optical signals are multiplexed by the multiplexer 338, and the multiplexed optical signals are output to the output-side optical amplifier 36 in FIG. 2.

The optical receiving unit 34 in FIG. 2 has a plurality of optical receivers RX1 to RXn for respectively receiving and processing the optical signals of respective wavelengths which are demultiplexed by the demultiplexer 332 in the OADM device 33. Each optical receiver RX1 to RXn converts a received optical signal to an electric signal, and then, performs clock recovery and data identification using the electric signal and performs error correction on the received signal using an error correction circuit (FEC circuit) (not illustrated). Furthermore, each optical receiver RX1 to RXn has a function as a monitor for monitoring a received optical signal quality, and transfers reception quality information INFrcv indicating the monitoring result to the NMS 10.

The optical transmitting unit 35 has a plurality of optical transmitters TX1 to TXn respectively corresponding to the respective wavelengths of the WDM light that is transmitted over the optical network. Each optical transmitter TX1 to TXn generates an optical signal (add-light) to be added to a network from the particular node, and outputs this optical signal to the multiplexer 334 in the OADM device 33. The output-side optical amplifier 36 receives the WDM light to which or from which an optical signal of a desired wavelength is added or dropped by the OADM device 33, amplifies the optical signals of respective wavelengths contained in the WDM light collectively, and outputs the amplified optical signals to a transmission line which connects between nodes.

From the NMS 10, the attenuation amount controller 37 receives information INFatt regarding attenuation amount setting to optical signals of respective wavelengths in the particular node. Then, the attenuation amount controller 37 makes fine adjustment of the angle of the reflection plane of the movable mirror corresponding to each selected light of respective wavelengths in the WSS 333 of the OADM device 33, so as to control the optical signal power of each wavelength output from the output port of the WSS 333.

From the NMS 10, the FEC controller 38 receives information INFfec regarding error correction setting to an optical signal (drop-light) that is terminated at the particular node. Then, the FEC controller 38 controls a drive state (selection among ON, OFF, and error correction ability) of the FEC circuit in the optical receiver RX corresponding to a drop wavelength within the optical receiving unit 34, according to the error correction setting information INFfec from the NMS 10.

In the foregoing descriptions, a configuration example of a node having an OADM device as disclosed in FIG. 2 was described. However, the nodes 1 to 4 on the network may include a node with no OADM device. The nodes with no OADM device includes, for example, an optical repeating node dedicated for collective amplification of WDM light supplied from a transmission line, a dispersion compensation node which is imparted with a chromatic dispersion compensation function, etc. However, it is generally difficult for the optical repeating node and the dispersion compensation node above to perform optical signal level adjustment for each wavelength. Thus, attenuation setting in each node for realizing a level diagram that takes into account traffic volume variations (described later in detail) is performed for a node with an OADM device having a function as a variable optical attenuator for each wavelength.

Figure 4:
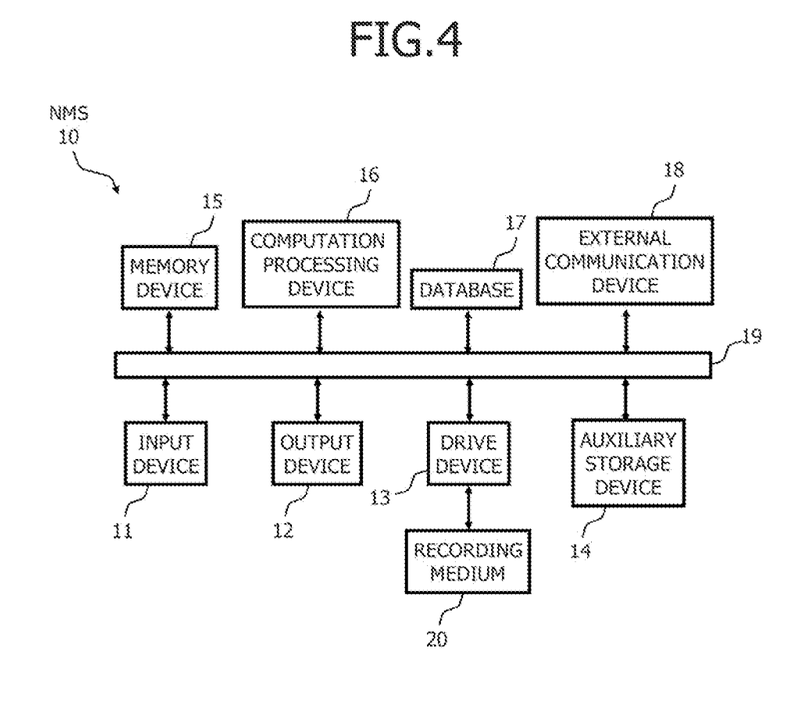
FIG. 4 is a diagram illustrating one example of a hardware configuration of an NMS in the embodiment.

FIG. 4 is a diagram illustrating one example of a hardware configuration of the NMS 10 in FIG. 1.

Referring to FIG. 4, the NMS 10 includes an input device 11, an output device 12, a drive device 13, an auxiliary storage device 14, a memory device 15, a computation processing device 16, a database 17, and an external communication device 18, and these components are interconnected by a system bus 19. The NMS 10 may be a dedicated device configuration, or may be a general-purpose personal computer, a workstation, etc.

Specifically, the input device 11 has a keyboard, a mouse, etc. which are used by an optical network manager to input various data therethrough. The output device 12, having a display for displaying various windows and data, etc., which are necessary for accessing therethrough a program on the NMS 10, displays a screen based on an execution program. The execution program installed in the NMS 10 is provided, for example, by a recording medium 20 such as a CD-ROM. The recording medium 20 in which programs are recorded is mounted on the drive device 13, and the execution program stored in the recording medium 20 is installed from the recording medium 20 to the auxiliary storage device 14 through the drive device 13.

The computation processing device 16 controls all processes by the NMS 10 including various calculations and operations described later, based on the execution program that is read out by and stored in the memory device 15. Furthermore, various information which is necessary during execution of a program can be obtained from the database 17 and can be stored. The external communication device 18 transmits information based on processing results at the computation processing device 16 to each node 1 to 4, and receives information transmitted from each node 1 to 4 to the NMS 10.

Next, the operations of the optical network of the embodiment will be described below.

In the optical network having the aforementioned configuration, an optical signal level of each wavelength can be adjusted using the function as a variable optical attenuator of the WSS 333, at a node with an OADM device 33 among the nodes 1 to 4. Thus, an optical signal level diagram for each wavelength transmitted within the optical network can be flexibly set according to traffic volume variations in the course of transmission. As described above, when a signal level is set higher at a span which can afford a relatively sufficient traffic volume, a received signal quality of a specific wavelength improves and the burden of performing error correction on this specific wavelength decreases, so that the power consumption of the overall optical network can be reduced.

Level diagram setting according to traffic volume variations within an optical network can be realized by performing computation to determine an optimum value of the attenuation amount at each node for minimizing a power consumption of the overall optical network by use of receipt quality information INFrcv collected from each node, and controlling the OADM device 33 in each node according to the computation results. Hereinafter, one example of a process performed at NMS 10 will be described in detail with reference to the flowchart in FIG. 5.

First, in step 11 (indicated by "S11" in FIG. 5, and so on), the NMS 10 provides optical network information. In this step of inputting optical network information, optical network information, which is necessary for computing an optimum value of the attenuation amount at each node, of an optical network to be managed, is input by use of an input device 11 (FIG. 4) by a network manager. Here, the aforementioned optical network information includes: network topology information; node information; span information; and wavelength path information.

Figure 5:
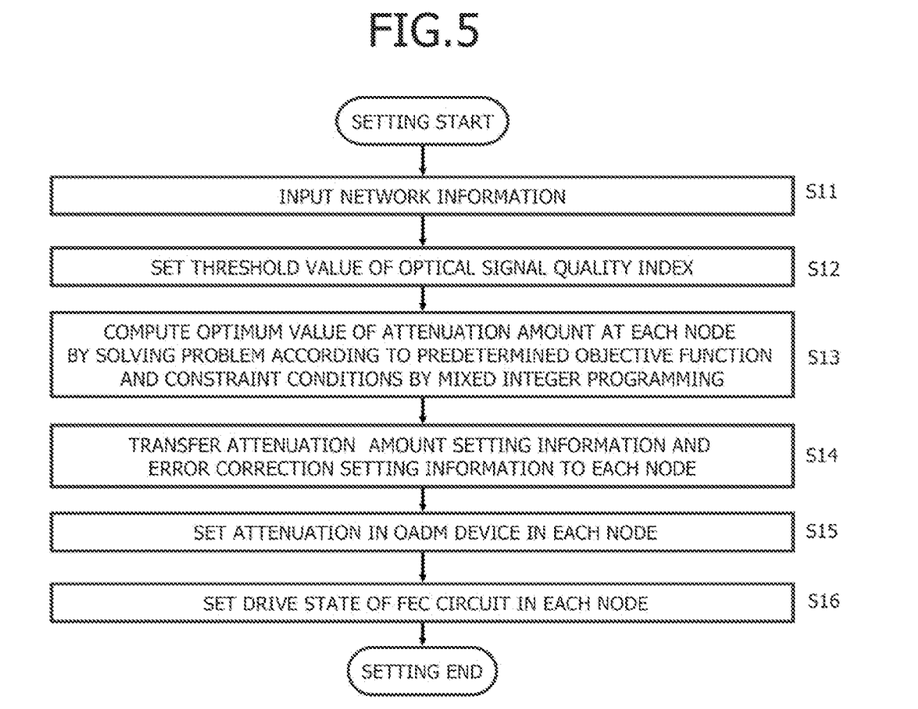
FIG. 5 is a flowchart illustrating one example of a process that is performed by the NMS in the embodiment.

Specifically, the network topology information includes, for example, information regarding positioning of the nodes 1 to 4 on the optical network, information regarding a connecting state between the nodes, etc. The node information includes: information regarding a type and a function of each node (for example, an OADM node, an optical amplifying-and-repeating node, a dispersion compensation node, etc.); and information regarding characteristics of an optical device provided in each node (for example, a noise figure of an optical amplifier, etc.). The span information includes information regarding an optical fiber used for a transmission line for connecting between adjacent nodes (for example, a fiber type, a fiber length, transmission loss, etc.). The wavelength path information includes: path information of optical signals of each wavelength transmitted on an optical network, wavelength information, and output power information of optical signals from each node. However, the network information input in step 11 is not limited to specific examples above, and any information related to a parameter that is used for computing an optimum value of the attenuation amount at each node described later may be used.

Next, in step 12, a threshold value concerning a optical signal quality at a terminal node of each wavelength path within the optical network is set as one parameter, which is necessary for computing the optimum value of the attenuation amount at each node, based on the optical network information that was input in step 11. Specifically, two or more threshold values are set for optical signal quality index F that is described later in detail. A first threshold value is set as a limit value that the optical signal quality index F at each terminal node on all wavelength paths must satisfy at the very least. A second threshold value is set as a lower limit of the optical signal quality index F at which an FEC circuit of an optical receiver in the terminal node can be turned off (deactivated). A third and subsequent threshold values are set as reference values of the optical signal quality index F used when turning on and off the FEC circuit, and used when lowering stepwise the error correction ability to reduce power consumption. Hereinafter, an n-th threshold is referred to as "Fth [n]".

Once the setting of threshold values in step 12 above is completed, then, the optimum value of the attenuation amount at each node for minimizing power consumption of the overall optical network is computed in step 13. Here, a case in which the mixed integer programming (MIP) that is one linear programming is applied for obtaining the aforementioned optimum value of the attenuation amount is illustrated by way of example. However, this does not mean that a computation approach to determine the aforementioned optimum value of the attenuation amount is limited to the MIP.

In this case, a function to "minimize power consumption of FEC circuit in each node of the optical network" is set as an objective function of the MIP. For example, assuming that i is a node number, and Wi is overall power consumption of an FEC circuit associated with all wavelengths at a node i, the objective function is represented by Formula (1) as follows.

$$\text{Minimize} \sum_i W_i \text{ for } \forall i \qquad (1)$$

Furthermore, as the constraint conditions in the MIP, for example, the conditions represented by Formulas (2) to (4) as follow are set.

$$F_{i,k} \geq Fth_1 \text{ for } \forall i, k \tag{2}$$

$$ATTlow_{i,k} \leq ATT_{i,k} \leq ATThigh_{i,k} \text{ for } \forall i, k \tag{3}$$

$$\sum_k Pout_{i,k} \leq MaxPout_i \text{ for } \forall i, k \tag{4}$$

Formula (2) above represents a condition that makes an optical signal quality index F of a wavelength channel k at the node i to be a first threshold value Fth[1] or more, assuming that k is a number assigned to an optical signal (wavelength channel) of each wavelength contained in the WDM light. Formula (3) above represents a condition that makes an attenuation amount ATT (antilogarithm value) applied to the wavelength channel k at the node i to be within a range between the upper value ATThigh and the lower value ATTlow thereof. The upper value ATThigh and the lower value ATTlow of the attenuation amount applied to the wavelength channel k at the node i are determined based on the range of attenuation amount which can be set by the WSS 333 (FIG. 2) and the VOA 337 (FIG. 3) used in the OADM device 33 of this node, based on the characteristics of the transmission line connected to this node, and based on the performance of the optical receiver for receiving this wavelength channel. Furthermore, Formula (4) above represents a condition that makes a total power of all wavelengths channels which are output from the node i to be less than a maximum value of output total power of WDM light, which is set to this node, assuming that Pout is a power of the wavelength channel k that is output from the node i.

Regarding each parameter in the objective function and constraint conditions as described above, the overall power consumption Wi of the FEC circuit associated with all wavelengths at the node i can be determined by Formula (5) as follows.

$$Wi = \sum_{n=1}^{N-1} NumFth[n]_i \cdot Wn \text{ for } \forall i \tag{5}$$

In Formula (5) above, NumFth[n]$_i$ represents the number of wavelength channels which makes the optical signal quality index at the node i to be within the range from the threshold value Fth[n] to the threshold value Fth[n+1]. Wn represents a power consumption of the FEC circuit that is applied to this wavelength channel. N represents the number of threshold values which are set for the optical signal quality index. Furthermore, if a required target value is previously set for the number of wavelength channels, the overall power consumption of an FEC circuit can be decreased even when the number of wavelength channels is equal to or more than this target value.

Furthermore, assuming that FinalOSNR is an optical signal to noise ratio of a wavelength channel k at a node i, and that NL is a quality deterioration amount caused by a nonlinear optical effect of the wavelength channel k at the node i, the optical signal quality index F of the wavelength channel k at the node i can be determined by Formula (6) as follows.

$$F_{i,k} = FinalOSNR_{i,k} - NL_{i,k} \text{ for } \forall i,k \tag{6}$$

FinalOSNR in Formula (6) can be computed by Formula (7) as follows, using an optical signal to noise ratio NodeOSNR$_{j,k}$ at each node j on the wavelength path from the transmission end to the node i.

$$FinalOSNR_{i,k} = \left( \sum_j^{nodes-one-wavelength-path} (NodeOSNR_{j,k})^{-1} \right)^{-1} \tag{7}$$

for $\forall i, j, k$

The NodeOSNR$_{j,k}$ in Formula (7) above can be obtained by monitoring OSNR of the received light in the optical receiver RXk corresponding to the wavelength channel k at the node j, and transferring the monitored value to the NMS 10 as receipt quality information INFrcv. Furthermore, NodeOSNR$_{j,k}$ may be computed using the computation expressions as follow corresponding to the configurations of the node j, in place of monitoring the OSNR of the received light at the optical receiver RXk. For example, when the node j has a principal part configuration (corresponding to the aforementioned OADM node configuration example in FIG. 2) as illustrated at an upper part of FIG. 6, NodeOSNR$_{j,k}$ can be computed using Formula (8) as follows.

$$NodeOSNR_{j,k} = \tag{8}$$

$$\left[ \left( \frac{Pin1_{j,k}}{NFpre_{j,k} \cdot h \cdot v \cdot \Delta f} \right)^{-1} + \left( \frac{ATT_{j,k} + Pin2_{j,k}}{NFpost_{j,k} \cdot h \cdot v \cdot \Delta f} \right)^{-1} \right]^{-1} \text{ for } \forall j, k$$

In Formula (8), NFpre$_{j,k}$ is a noise figure (NF) of an input-side optical amplifier, and NFpost$_{j,k}$ is a noise figure of an output-side optical amplifier. Each value of NFpre$_{j,k}$ and NFpost$_{j,k}$ refers to node information that is input in step 11. In addition, ATT$_{j,k}$ is an attenuation amount (antilogarithm value) applied to a wavelength channel k at the WSS that is disposed in a previous stage of the output-side optical amplifier. Furthermore, Pin1$_{j,k}$ represents the input power of the wavelength channel k to the input-side optical amplifier, and Pin1$_{j,k}$ represents the input power of the wavelength channel k to the WSS. Each value of Pin1$_{j,k}$ and Pin2$_{j,k}$ can be computed based on the node information, span information and wavelength path information, which are input in step 11. In addition, h is the Planck's constant, v is a frequency of the wavelength channel k, and Δf is an OSNR measurement bandwidth.

Figure 6:
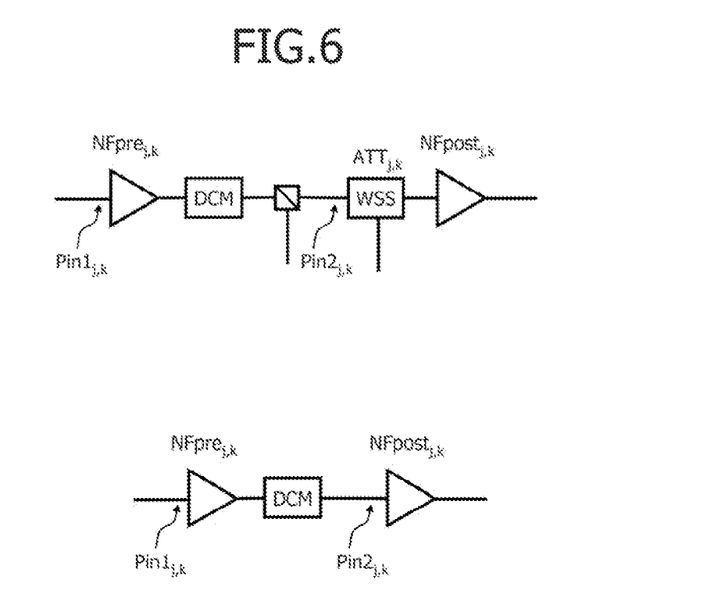
FIG. 6 is a diagram illustrating how to calculate an OSNR at each node.

Alternatively, when the node j has a principal part configuration (corresponding to the dispersion compensation node) as illustrated at a lower part of FIG. 6, NodeOSNR$_{j,k}$ can be computed using Formula (8) as follows, assuming Pin2$_{j,k}$ is the input power of the wavelength channel k to the output-side optical amplifier.

$$NodeOSNR_{j,k} = \tag{9}$$

$$\left[ \left( \frac{Pin1_{j,k}}{NFpre_{j,k} \cdot h \cdot v \cdot \Delta f} \right)^{-1} + \left( \frac{Pin2_{j,k}}{NFpost_{j,k} \cdot h \cdot v \cdot \Delta f} \right)^{-1} \right]^{-1} \text{ for } \forall j, k$$

Furthermore, regarding NL$_{i,k}$ in Formula (6) mentioned above, the matter that change of the aforementioned attenuation amount to the wavelength channel k in the node j above influences on the nonlinear optical effect which occurs on a fiber of transmission line is taken into account. Specifically, $NL_{i,k}$ can be computed using Formula (10) as follows, assuming that $ATT_{j,k}$ is an attenuation amount to the wavelength channel k in the node j, and $\alpha_{j,k}$ is a constant for converting $ATT_{j,k}$ to a quality deterioration amount resulting from the nonlinear optical effect. Note that $\alpha_{j,k}$ is determined according to the traffic volume and the conditions of the transmission line fiber in the optical network.

$$NL_{i,k} = -\sum_{j}^{nodes-on-wavelength-path} \alpha_{j,k} \cdot ATT_{j,k} \text{ for } \forall\, i, j, k \tag{10}$$

Here, one example that the optical signal to noise ratio $FinalOSNR_{j,k}$ of the wavelength channel k at the node i and the quality deterioration amount $NL_{i,k}$ resulting from the nonlinear optical effect that occurs on the transmission line fiber are taken into account to determine the optical signal quality index $F_{i,k}$ has been described. However, the aforementioned $NL_{i,k}$ is not necessarily taking into account by appropriately setting the lower limit of the attenuation amount $ATTlow_{i,k}$ in Formula (3) among the constraint conditions mentioned above, so as not to occur the nonlinear optical effect on the transmission line fiber. That is to say, the term $NL_{i,k}$ in the right side of Formula (6) above can be deleted.

When the objective function and constraint conditions in the MIP are set as described above, the optimum value of the attenuation amount at each node for minimizing the power consumption in the overall optical network can be computed using a conventional mathematical programming software.

Returning the flowchart in FIG. 5, once the optimum value of the attenuation amount at each node is computed by the MIP in step 13, the calculation result is output to the output device 12 (FIG. 4) in step 14, and attenuation amount setting information INFatt corresponding to each node is generated at the NMS 10 according to the calculation result, and is transferred to the attenuation amount controller 37 (FIG. 2) in each node via the external communication device 18 (FIG. 4). Furthermore, error correction setting information INFfec to the wavelength channel terminated at each node is generated at the NMS 10 based on the calculation result above, and this error correction setting information INFfec is transferred to the FEC controller 38 (FIG. 2) in each node via the external communication device 18.

When the number of threshold values set for the optical signal quality index to be processed by the MIP is two, the aforementioned error correction setting information INFfec is information indicating that the FEC circuit is set ON for the wavelength channel with the optical signal quality index being equal to or greater than the threshold Fth[1] and being less than the threshold Fth[2]. And the INFfec is information indicating that FEC circuit is set OFF for the wavelength channel with the optical signal quality index being equal to or greater than the threshold Fth[2]. Furthermore, when the number of threshold values set for the optical signal quality index is three, the error correction setting information INFfec is information indicating that the FEC circuit is set ON with the error correction ability of the FEC circuit being set higher for the wavelength channel with the optical signal quality index at the terminal node being equal to or greater than the threshold Fth[1] and being less than the threshold Fth[2]. And the INFfec is information indicating that the FEC circuit is set ON with the error correction ability of the FEC circuit being set lower for the wavelength channel with the optical signal index at the terminal node being equal to or greater than the threshold Fth[2] and less than the threshold Fth[3]. And the INFfec is information indicating that FEC circuit is set OFF for the wavelength channel with the optical signal quality index being equal to or greater than the threshold Fth[3]. Furthermore, when the number of threshold values set for the optical signal quality index is four or more, the error correction ability of the FEC circuit is altered stepwise according to the value of the optical signal quality index.

In step 15, the attenuation amount controller 37 in each node that receives the attenuation amount setting information INFatt from NMS 10 controls the WSS 333 (FIG. 2) in the OADM device 33 or the VOA (FIG. 3) in the OADM device 33' according to the attenuation amount setting information INFatt, so that the attenuation amount to be applied to each wavelength channel at the node is set. Subsequently, in step 16, the FEC controller 38 in each node which receives the error correction setting information INFfec from the NMS 10 controls the drive state (selection among ON, OFF, and error correction ability) of the FEC circuit in the optical receiver RX for the intended wavelength channel according to the error correction setting information INFfec.

Figure 7:
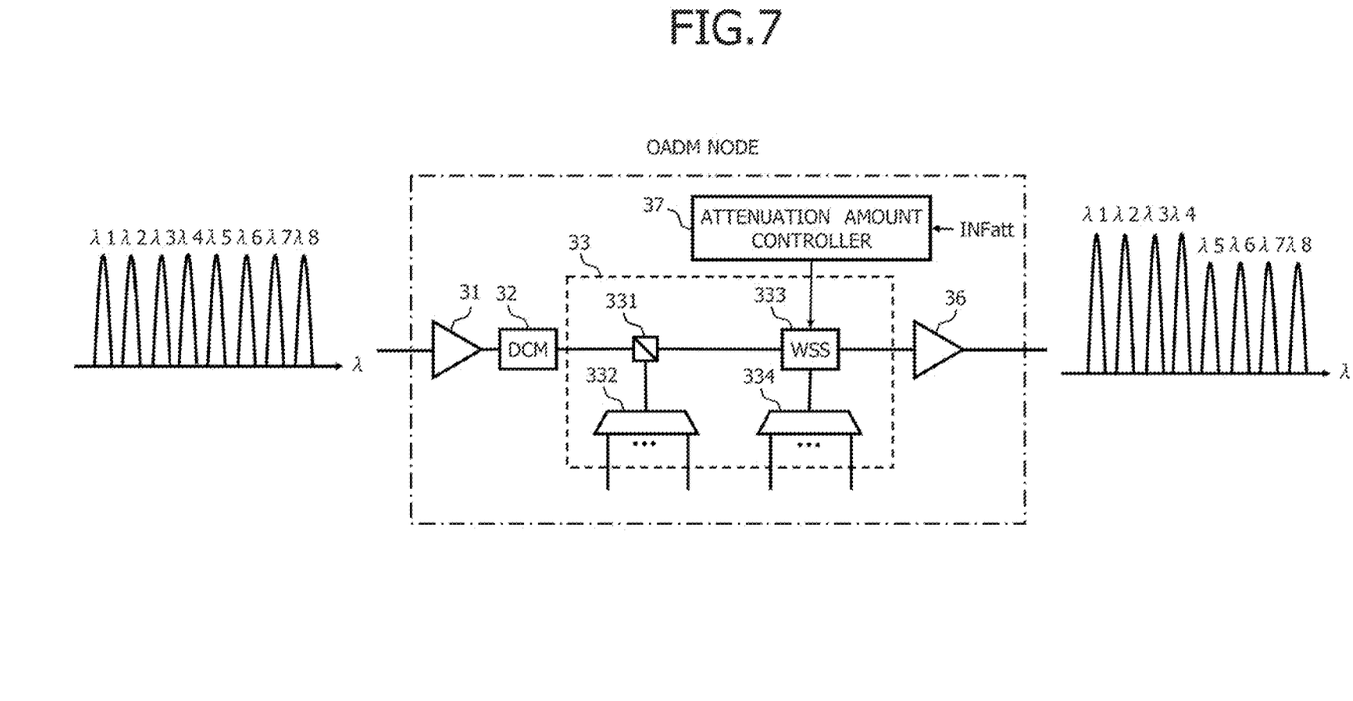
FIG. 7 is a diagram illustrating a manner in which a level of a signal of each wavelength channel passing through an OADM node changes by attenuation optimization at the OADM node.
Figure 8:
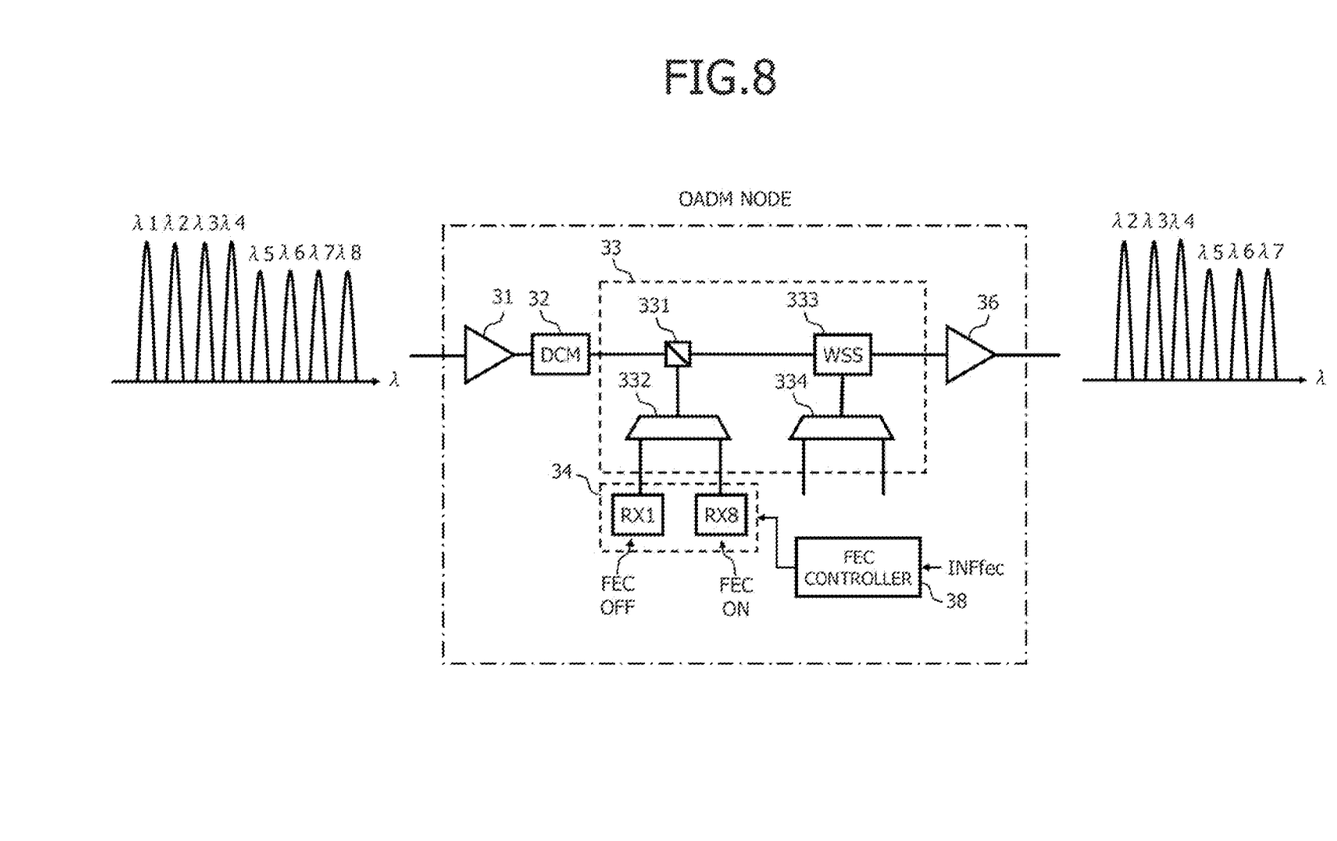
FIG. 8 is a diagram illustrating a drive state of an FEC circuit in an optical receiver for a wavelength channel which is terminated at a node downstream from the OADM node in FIG. 7.

Owing to the processes in steps 15 and 16 above, for example, as illustrated in the conceptual view of FIG. 7, WSS 333 in the OADM node through which the WDM light containing wavelength channels λ1 to λ8 is controlled so that the attenuation amount applied to each wavelength channel λ5 to λ8 is greater than that applied to each wavelength channel λ1 to λ4, whereby the signal level of each wavelength channel λ1 to λ4 among the WDM light is made higher than the signal level of each wavelength channel λ5 to λ8. In the OADM node, located downstream the aforementioned OADM node, at which the wavelength channels λ1 and λ8 terminate, as illustrated in the conceptual diagram in FIG. 8, the FEC circuit in the optical receiver RX 1 for the wavelength channel λ1 having a higher signal level is set OFF, whereas the FEC circuit in the optical receiver RX 8 for the wavelength channel λ8 having a lower signal level is set ON.

With a series of processes in steps 11 to 16 as described above, the optical signal level diagram for each wavelength transmitted over the optical network is optimized for each wavelength channel and for each span corresponding to the node having an OADM device, according to the traffic volume variation within the optical network, so that the received signal quality of a specific wavelength is improved. As a result, the burden of performing error correction on this specific wavelength decreases, so that it becomes possible to efficiently reduce power consumption of the overall optical network while maintaining a required received signal quality for each wavelength.

In the embodiments above, one example in which a quality deterioration amount resulting from an optical signal to noise ratio and a nonlinear optical effect is used as an optical signal quality index was described. However, in addition thereto, the number of error corrections, a bit error rate (BER) and a Q-value, which are detected when performing error correction in an optical receiver may be used as the optical signal quality index. Furthermore, for example, the ratio of the average power to the standard deviation of an received signal, which are monitored by a digital coherent receiver as disclosed in Japanese Laid-Open Patent Publication No. 2009-198364 may be used as the optical signal quality index.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical network comprising: a plurality of nodes which are interconnected via a transmission line; and a network management system for centrally managing operations of the plurality of nodes, wherein each of two or more nodes among the plurality of nodes comprises:

an optical add-drop multiplexer configured to receive an optical signal transmitted through the transmission line, and configured to add or drop an optical signal having a predetermined wavelength to or from the optical signal;

an optical receiver configured to receive an optical signal that is dropped at the optical add-drop multiplexer;

an attenuator configured to variably attenuate an optical signal power of each wavelength that is added from this node to the transmission line, on a wavelength-to-wavelength basis;

an attenuation amount controller configured to control an attenuation amount corresponding to each wavelength at the attenuator;

a monitor configured to monitor a quality of the optical signal that is received by the optical receiver, and configured to transfer receipt quality information that represents the monitoring result to the network management system; and an error correction controller configured to control a drive state of an error correction circuit for performing error correction on a received signal at the optical receiver, wherein the network management system comprises:

an input unit through which optical network information is input;

a threshold value setting unit configured to set two or more threshold values for an optical signal quality index which indicates a signal quality at a terminal node for an optical signal of each wavelength that is transmitted over the optical network, based on the optical network information that is input through the input unit;

a computing unit configured to determine the optical signal quality index corresponding to each wavelength based on the receipt quality information transferred from the respective nodes, and configured to compute an attenuation amount corresponding to each wavelength at the attenuator in the respective nodes so that all of the optical signal quality indexes are equal to or greater than a lowest threshold value that is set at the threshold value setting unit and so that the number of wavelengths, which makes the optical signal quality index to be greater than the threshold values other than the lowest threshold value set at the threshold setting unit, is equal to or more than a target value; and a communication unit configured to transfer attenuation amount setting information, which indicates the computation result by the computing unit, to the attenuation amount controller, and configured to transfer error correction setting information, which indicates error correction setting corresponding to each wavelength that is determined based on the computation result by the computing unit, to the error correction controller.

2. The optical network according to claim 1, wherein the computing unit determines an attenuation amount corresponding to each wavelength at the attenuator in the respective nodes so that all of the determined optical signal quality indexes are equal to or greater than the lowest threshold value that is set at the threshold value setting unit and so that the number of wavelengths, which makes the optical signal quality index to be greater than a highest threshold value that is set at the threshold value setting unit is equal to or more than a target value.

3. The optical network according to claim 1, wherein the error correction controller is configured to turn OFF the error correction circuit corresponding to an optical signal having the optical signal quality index that is equal to or greater than a highest threshold values, among the optical signals which are terminated at the node, and to turn ON the error correction circuit corresponding to an optical signal having the optical signal quality index less than the highest threshold value, according to the error correction setting information transferred from the network management system.

4. The optical network according to claim 3, wherein the error correction controller is configured to stepwise select a drive state of the error correction circuit corresponding to an optical signal having the optical signal quality index that is less than the highest threshold value, so that an error correction ability lowers as the optical signal quality index increases with respect to the threshold values other than the highest threshold values.

5. The optical network according to claim 1, wherein the optical add-drop multiplexer includes a wavelength selective switch which allows light input-output path alternation according to wavelength, and the wavelength selective switch has a function as the attenuator.

6. The optical network according to claim 1,
wherein the optical add-drop multiplexer includes a demultiplexer adapted to demultiplex wavelength division multiplexed light, and a multiplexer adapted to multiplex optical signals having respective wavelengths which are demultiplexed by the demultiplexer; and
wherein the attenuator includes a plurality of variable optical attenuators which are respectively disposed on optical paths corresponding to respective wavelengths between the demultiplexer and the multiplexer.

7. The optical network according to claim 1, wherein the computing unit is adapted to compute the attenuation amount corresponding to each wavelength at the attenuating unit in each node using a mixed integer programming.

8. The optical network according to claim 1, wherein the optical signal quality index includes an optical signal to noise ratio as a parameter.

9. The optical network according to claim 8, wherein the monitor is adapted to monitor an optical signal to noise ratio of the optical signal received by the optical receiver.

10. The optical network according to claim 8, wherein the optical signal quality index includes a quality deterioration amount resulting from a nonlinear optical effect on the transmission line as a parameter.

11. The optical network according to claim 1, wherein the plurality of nodes are connected in a mesh-like manner via the transmission line.

12. The optical network according to claim 1, wherein the plurality of nodes include an optical repeating node which receives an optical signal transmitted through the transmission line and amplifies the optical signal.

13. The optical network according to claim 1, wherein the plurality of nodes include a dispersion compensation node which receives an optical signal transmitted through the transmission line and compensates for chromatic dispersion of the optical signal.

14. A control method for an optical network which includes a plurality of nodes interconnected via a transmission line, and a network management system for centrally managing operations of the nodes, the control method comprising:
- in the network management system, receiving optical network information, and setting two or more threshold values for an optical signal quality index indicating a signal quality at a terminal node for an optical signal of each wavelength transmitted through the optical network, based on the optical network information;
- in two of more optical add-drop multiplexing nodes, which receive an optical signal transmitted through the transmission line and adds or drops an optical signal having a predetermined wavelength to or from the received optical signal, among the plurality of nodes, monitoring a quality of a dropped optical signal, and transferring receipt quality information indicating the monitored result to the network management system;
- in the network management system, determining the optical signal quality index corresponding to each wavelength based on the receipt quality information transferred from the respective optical add-drop multiplexing nodes, and computing an attenuation amount corresponding to each wavelength at the respective optical add-drop multiplexing nodes so that all of the optical signal quality indexes are equal to or greater than a lowest threshold value among the two or more threshold values and so that the number of wavelengths, which makes the optical signal quality index to be greater than the threshold values other than the lowest threshold value, is equal to or more than a target value;
- transferring attenuation amount setting information indicating a computed result in the network management system to the respective optical add-drop multiplexing nodes, and transferring error correction setting information indicating error correction setting corresponding to each wavelength that is determined based on the computed result, to the respective optical add-drop multiplexing nodes; and
- in the respective add-drop multiplexing nodes, attenuating an optical signal power of each wavelength to be added from the optical add-drop multiplexing node to the transmission line on a wavelength-to-wavelength basis according the attenuation amount setting information from the network management system, and controlling a drive state of an error correction circuit for correcting an error in an received signal that is received at the optical add-drop multiplexing node, according to the error correction setting information from the network management system.

* * * * *